Feb. 21, 1967 J. J. MAUGET 3,304,655
METHOD OF INJECTING PLANTS
Original Filed July 26, 1965
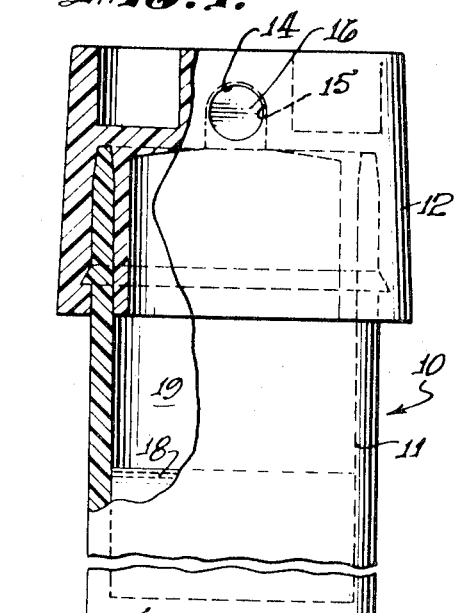
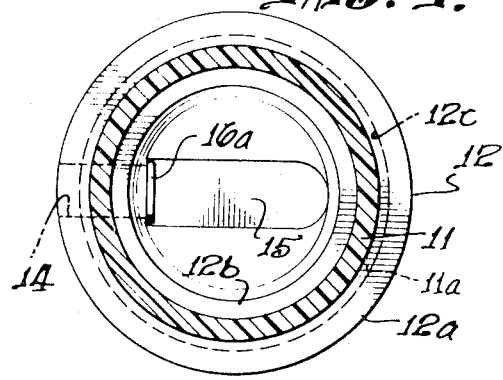
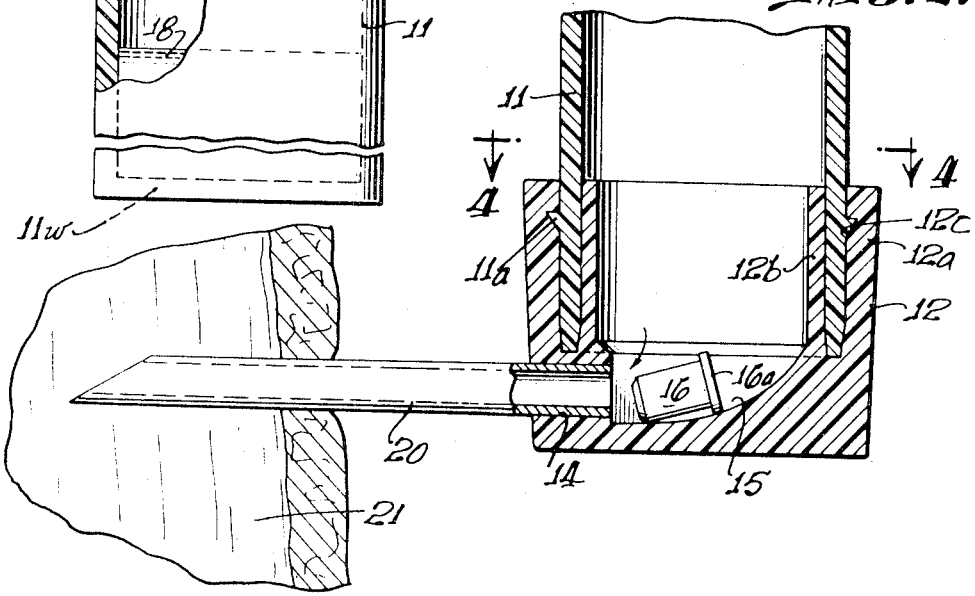
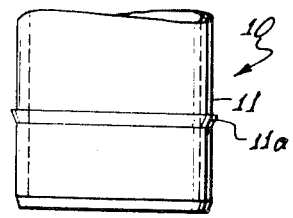
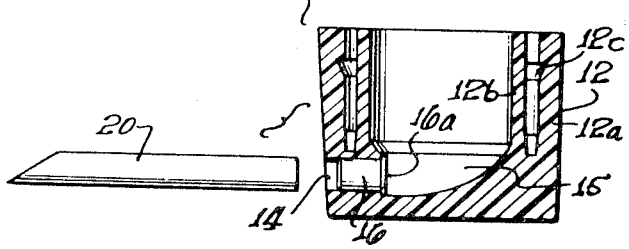
JAMES J. MAUGET,
INVENTOR.
BY Knight & Rodgers
ATTORNEYS United States Patent Office 3,304,655
Patented Feb. 21, 1967

3,304,655
METHOD OF INJECTING PLANTS
James J. Mauget, 1043 Bilton Way,
San Gabriel, Calif. 91776
Original application July 26, 1965, Ser. No. 478,525. Divided and this application Oct. 20, 1965, Ser. No. 498,800
2 Claims. (Cl. 47—57.5)

This application is a division of my co-pending application Serial No. 478,525, filed July 26, 1965, for Method and Apparatus for Injecting Plants, which, in turn, is a continuation-in-part of my then co-pending application Serial No. 197,798, filed May 25, 1962, for Method and Apparatus for Injecting Plants, now abandoned.

The present invention relates generally to a method of injecting plants with liquids of various types; and more especially to the development of a technique for safe handling of toxic solutions in containers and under a slight super-atmospheric pressure for treating plants by injecting methods.

The plants most commonly treated by the injection methods are trees because they have a large stem or trunk; but, generally speaking, any shrub or bush or other plant with a main stem of a size sufficient to receive the feeding tube can be treated by injection methods and means.

Injection of a plant is carried out by inserting a feeder tube into the stem of the plant deeply enough that the open inner end of the tube is inwardly of the cortex layer of the trunk. The equipment may be compared with a hypodermic needle used on humans; and the injection method is similar to intravenous injection or feeding since the result is the injection of the desired liquid directly into the sap stream of the plant.

In addition to the administration of nutritional solutions, various liquids may be administered to effect growth control, prevention of disease, and elimination of insects which feed upon the leaves or upon the woody structure of the plant. These methods of treatment are generally referred to as chemo-therapy. Insects as well as virus and fungus infections can now be controlled in many situations by the use of various antibiotics and systemic insecticides. Research has shown the insecticides now available are very effective in controlling, combating and eliminating various insect pests and thereby the spread of many diseases. The spread of diseases, for example the Dutch elm disease, can in many cases be controlled by administering antibiotics and insecticides to infected plants. Chemotherapeutic methods often achieve results that are extremely difficult if not impossible to achieve by more conventional methods of treating plant diseases and infections.

However, serious problems arise in the handling and application by injection of toxic liquids to trees and other plants. Liquids have in the past been administered by gravity type reservoirs attached to feeder tubes inserted in the plant stems. While these feeders are entirely satisfactory for many situations, they have certain definite limitations which render them unsuitable for handling of toxic materials. This is chiefly because the gravity feeders are not hermetically sealed and are therefore not suitable for handling of modern systemic insecticides which are toxic to humans and should, for safety reasons, be shipped, sold and otherwise handled only in completely sealed containers.

At the present time there are known and available for treatment of plants various systemic insecticides of very superior and effective action that offer the utmost in plant protection. For example, phosphate base insecticides. However, these materials are of such high toxicity to humans and warm blooded animals that official regulations bar their use by the home gardener and make even their use by licensed persons cumbersome and expensive. This is because of the great hazard of being poisoned by inhalation of the fumes or by direct contact with the materials themselves, hazards which are present with previously available means for applying materials to plants by injection methods. The same hazards are also involved in the general handling, transportation, and distribution of the toxic materials themselves.

Thus it becomes a general object of my invention to provide a safe method and means for handling and injecting into plants liquids that are highly toxic to humans and to make such toxic materials generally available to the public at large by substantially eliminating the hazards involved with such materials to the users or other people.

A further object of the invention is to devise a safe method of handling toxic materials and injecting the material into a stem of a plant.

These objects of the invention have been achieved in an apparatus for injecting liquids directly into the stem of the plant, comprising a hermetically sealed container, preferably formed from a cup closed at one end and a cap closing the open end of the cup to form the container holding a quantity of liquid to be administered to a plant. The container has a thickened wall portion through which a discharge passage extends, said passage being adapted to receive an injection tube and being initially closed by a displaceable plug at its inner end to prevent liquid in the container from entering the passage. A combined container unsealing and liquid injection tube has one end insertable in the passage to a position at which the tube displaces said plug inwardly of the passage and opens the passage to receive the liquid in the container. The other end of the tube is sharpened and is insertable into the stem of a plant to administer the liquid to the plant. The tube is a rigid member continuously open throughout its full length, and of a size to fit tightly in the discharge passage. A body of gaseous propellant above and in direct contact with the liquid in the container exerts a sufficient pressure thereon to discharge all of the liquid rapidly from the container into the plant.

Safe handling of the toxic liquid is insured by enclosing the liquid in a sealed, gas-tight container along with the gaseous propellant, first setting the sharpened end of the hollow injection tube in the stem of the plant to be injected, and then inserting the other end of the tube in the discharge passage in the container to effect a liquid tight seal between the tube and the container before the plug is displaced, so that the user is at no time exposed to either the fumes from the toxic material or contact with the liquid itself. The container wall is breached by the tube to allow the liquid to be discharged into the plant through the feeder tube.

How the above and other objects of my invention are attained will be better understood by reference to the following description and to the annexed drawing in which:

FIG. 1 is a combined side elevation and partial section of a liquid injection device illustrating a preferred embodiment of the present invention.

FIG. 2 is a fragmentary vertical section showing the disposable container mounted on a feeder tube in position for injecting liquid into the stem of a tree or other plant.

FIG. 3 is an exploded view showing a portion of the container, the cap in section, and the feeder tube and the relative positions of the parts as they are assembled.

FIG. 4 is a horizontal section on line 4—4 of FIG. 2.

Referring now to the drawing, there is shown in FIG. 1 a fluid injection device constructed according to the present invention which comprises a sealed container indicated generally at 10. The container is preferably made in two parts, a cup 11 and a cap 12, which fit together in a telescoping relation. The cup is cylindrical in shape and closed at one end by an integral wall 11w, the other open end being closed by cap 12 which provides an end wall for the container at the opposite end thereof.

As may be seen in both FIGS. 1 and 2, cap 12 comprises a pair of spaced annular skirts 12a and 12b between which the wall of cup 11 is received. The inner skirt 12b is designed to fit snugly within the inner cylindrical surface of the cup and to effect a fluid tight seal with the inner face of the cup wall, when the cup and cap are telescoped together. It will be appreciated that internal pressure within the container tends to improve or increase the sealing contact between the annular skirt 12b and the cup wall, thus assuring that the liquid contents of the container are securely enclosed.

The outer skirt 12a is of a diameter to slide snugly over the outer face of the cup wall and is provided with locking means holding the cap in place on the cup. As shown particularly in FIG. 2, it will be seen that cup 11 has an external ridge 11a of angular cross section. Cup 12 is provided with a corresponding groove 12c on the inner face of skirt 12a. When the cap is forced over the end of the cup, locking ridge 11a enters and seats firmly in groove 12c, holding the cap in place and resisting any tendency to separate the two parts of the container. The annular space between the two skirts is preferably tapered inwardly slightly to effect a tight engagement with the cup wall.

Ridge 11a and groove 12c are preferably of right triangular cross section, as shown. Thus each has a generally radial surface forming an annular shoulder. The two shoulders face oppositely to engage each other as in FIG. 2, forming a non-releasable locking means preventing separation of the cup and cap once they are sealed together. Hence, the container, for practical purposes, cannot be reopened and re-filled.

Materials such as glass or high density polyethylene are preferred for the cup as they have little or no permeability to the gaseous propellant. Low permeability to gas permits the wall of the cup to be relatively thin, producing a light-weight container as the cup normally constitutes the major portion of the container. The cap, when of low or medium density polyethylene, has a relatively higher permeability for a given wall thickness; so this is compensated for by making the walls of the cap thicker, as shown, especially the end wall. This is also a reason why plug 16 is preferred as a means for closing passage 14, as the plug has sufficient length to have satisfactorily low gas permeability. The low or medium density polyethylene in the cap provides an advantageous material that engages the inside wall of the cup with a gas and liquid tight contact without requiring cement or the like.

It will be noted that in the preferred form cap 12 is provided with a short fluid passage 14 which communicates at one end with the exterior of the cap and at the other end with the interior space of the container. Passage 14 is located in the relatively thicker wall portion of the container, provided by cap 12. This permits plug 16 at the inner end of the passage to be long enough to develop a fluid tight seal with the passage wall and also be long enough to have acceptably low gas permeability. Furthermore, passage 14 can be made longer than plug 16 thereby obtaining various advantages, including the fact that the plug is recessed and thereby protected against being struck from the outside in a manner to dislodge it accidentally.

Passage 14 is initially closed by a displaceable sealing means which preferably takes the form of cylindrical plug 16 inserted into passage 14 from the inner or inlet end thereof. The plug preferably has a small flange 16a at one end which bears against a shoulder on the inside of cup 12. Flange 16a is pressed against this shoulder by internal pressure within the container so that the seal between the plug and the container is improved as the pressure increases. The flange also prevents the plug from being accidentally pushed outwardly through passage 14 because of internal pressure and allows displacement of the plug only inwardly from passage 14 into the container.

When the two parts 11 and 12 of the container are assembled, the container is hermetically sealed and cannot be opened or the contents removed except through passage 14 which is the sole means of access to the interior of the finished container.

When initially filled, the container is in the upright position of FIG. 1 and measured quantity of liquid 18 is placed within the cup. This liquid is any material which it may be desired to administer to a plant. In some cases the nutrients or insecticides are liquids themselves. Should the material be normally in solid form, it will be placed in aqueous solution and the body of liquid 18 will be a solution of the material. Above the liquid there is then injected a small quantity of a suitable propellant, immediately after which cap 12 is placed over the open end of the cup. This propellant may be any suitable material; and is normally in liquid or solid form when placed in the container. Well known propellants are the fluorinated hydrocarbons commercially available under the trademark "Freon," for this purpose. Another propellant is carbon dioxide, which can be inserted in the container in either solid or liquid form immediately prior to capping. The carbon dioxide quickly vaporizes as it is a gas at ordinary temperatures.

Typically, the cup portion of the container is filled approximately half full with the liquid 18. The pressure of the gaseous propellant which initially occupies space 19 above the body of liquid 18 is reduced to one-half the initial value as the gas expands to fill the container as the container is emptied. An initial pressure of only slightly above atmospheric, for example 4 or 5 pounds is quite adequate for the uses here intended. Accordingly, gas pressure at the time of filling is normally 10–15 p.s.i., more or less, to allow for some loss of gas drive by permeation through the container walls during storage prior to use.

After the container is filled and capped, it is normally stored in an upright position as in FIG. 1. In order to use the container, a tube 20 is first driven into the stem 21 of the tree or other plant to be treated. Tube 20 is a combined container unsealing and liquid injecting member that is a rigid, hollow, cylindrical tube, continuously open throughout its full length and sharpened at one end, as by being cut diagonally at one end in order to improve its penetration of the plant stem. Although the tube may be driven into the plant stem in any convenient and suitable manner, it is preferred to set it by means of the tool shown and described in my Patent No. 2,796,701, issued June 25, 1957, for Tool for Placing Feeding Tubes in Plant Stems.

Once injection tube 20 has one end set firmly in the plant stem 21, the other end of the tube is inserted in the open end of fluid passage 14. Passage 14 is preferably cylindrical in shape to match the shape of feeder tube 20 and the tube and passage are of such diameters that the tube snugly fits within the passage, thus insuring a fluid-tight fit in direct contact with the walls of the passage. At the same time, the frictional resistance to movement of the tube within the passage is not so great but what the container can be forced axially of tube 20 to move the tube inwardly of passage 14 to a position such, as shown in FIG. 2, that the inner end of the tube displaces plug 16 from the inner end of passage 14 and thereby opens the passage to receive liquid freely from the interior of the container. While in a strict sense, the liquid flows outwardly through the tube, the liquid also flows through the passage, since the tube may be viewed as a liner for the passage and also as means for conveying the liquid from the container into the plant stem.

Tube 20 is a simple, valve-less structure; but by the sequence of steps mentioned, the wall of the container is breached in a manner to provide free continuous access of the liquid to the plant. Container 10 is also a simple, inexpensive structure devoid of valves or complicated mechanism. The tube makes a fluid-tight seal directly with the container wall at passage 14 without the need of any gasket or added seal; and since this seal is established before plug 16 is displaced, actually in this illustrated design before the plug is moved, no valve is required to control fluid flow. The result is a basic, simple structure.

In position for injection, the container is in the inverted position in FIG. 2. Obviously the liquid body therein falls into cap 12 at the bottom of the container and the gas moves to the top. The body of gas is in direct contact with the liquid and it exerts enough pressure thereon to drive it through the tube and into the plant stem. It has been determined by experiment that a dosage of three milliliters can be emptied from a container of this character within two minutes with an initial gas pressure of 4 p.s.i. The gas within the pressurized container not only exerts a driving force on the liquid but prevents the formation of a subatmospheric pressure in the upper portion of the container which would slow up the removal of the liquid from the container. The rapid emptying action insures that a high concentration of the antibiotic or insecticide will be present in the sap stream of the tree. Complete emptying is insured by the downwardly sloping walls and the action of sump 15. It will be appreciated that with a small dosage, usually of the order of 2-5 milliliters, in a container, substantially complete emptying is highly desirable in order to obtain injection of a full strength dose. Also, the quantity of toxic material left in an emptied container is reduced to a minimum level that makes subsequent handling and disposal safe and easy.

According to the improved method of my invention, a toxic liquid can be handled and injected into the stem of a plant without any danger from contact by the user with either fumes from the liquid or the liquid itself. The method has been described in conjunction with a specific container for purposes of adequate disclosure; but it will be understood that the method is not limited to the container illustrated. Generally, any hermetically sealed container enclosing a liquid may have the enclosure breached in the manner set forth to inject a tree or other plant.

From the foregoing description, it will be understood that various changes in my improved method may occur to persons skilled in the art without departing from the spirit and scope of my invention. Accordingly, it is to be understood that the foregoing description is considered to be illustrative of, rather than limitative upon, the invention as defined by the appended claims.

I claim:
1. The method of injecting a toxic liquid into a plant from a hermetically sealed container, that includes the steps of:
   placing the liquid in a container and sealing the container;
   pressurizing the container;
   setting one end of a hollow tube into a plant to be treated;
   engaging the other end of the tube in fluid-tight relation with the container;
   and driving said tube through the container wall to breach the wall and to destroy permanently the hermetic character of the container and thereby to discharge the liquid from the container through the tube in response to pressure on the liquid.

2. The method of injection of a toxic liquid into a plant from a hermetically sealed container in which said liquid is maintained under pressure, that includes the steps of:
   setting one end of a hollow tube into a plant to be treated;
   engaging the other end of the tube in fluid-tight relation with the container;
   and using said tube to destroy the hermetic character of the container with said tube and to establish free communication of the liquid in the container with the plant whereby the liquid is discharged from the container in response to said gas pressure.

References Cited by the Examiner
UNITED STATES PATENTS
3,124,904   3/1964   Mauget _____ 47—57.5

ABRAHAM G. STONE, *Primary Examiner.*
R. E. BAGWILL, *Assistant Examiner.*